UNITED STATES PATENT OFFICE.

EUGENE C. SULLIVAN AND WILLIAM CHITTENDEN TAYLOR, OF CORNING, NEW YORK, ASSIGNORS TO CORNING GLASS WORKS, OF CORNING, NEW YORK, A CORPORATION OF NEW YORK.

GLASS.

1,408,145.

Specification of Letters Patent. Patented Feb. 28, 1922.

No Drawing. Application filed December 16, 1920. Serial No. 431,311.

*To all whom it may concern:*

Be it known that we, EUGENE C. SULLIVAN and WILLIAM C. TAYLOR, citizens of the United States of America, and residents of Corning, New York, have invented certain new and useful Improvements in Glass, of which the following is a specification.

This invention relates to a glass, which, while especially suited for use in the fabrication of electric lamp bulbs, is capable of use for the fabrication of other articles.

The object had in view is to obtain a soft leadless glass having desirable viscosity curve similar to that of lead glass long used in the fabrication of bulbs.

Further objects are to obtain a glass having such a co-efficient of expansion as will permit the proper sealing in of platinum leading-in-wires and having good stability and which will not devitrify under repeated heating in working. A sodium-silicate glass containing soda and silica alone in certain proportions has the desired properties as to softness, viscosity and expansion, but the stability of such a glass is poor, and the invention, therefore, contemplates means for increasing the stability of such a composition with as little detrimental disturbance as may be, of the other desired properties. This is accomplished by using in addition to the alkali and silica, a limited amount of the bivalent oxides (preferably CaO and MgO) and a limited amount of aluminia, as we have discovered that aluminia, when used in limited quantities, has a marked effect in increasing the stability of that glass and in permitting the omission of a part, at least, of the bivalent oxides previously used, such substitution of aluminia as we have discovered tending to give a better viscosity curve.

As examples of glasses falling within this invention, the following are given:

The magnesia is intendedly introduced as a substitute for lime for the reasons stated at length in our other application Sr. No. 294,528, filed Aug. 30, 1920, Patent No. 1,369,988, May 6, 1919, of which this is filed as a continuation in part, composition C being composition VI of the said application.

Having thus described our invention, what we claim is,—

1. A glass containing over 70% silica, over 20% soda and oxides of the bivalent elements of the second group of the periodic system, the molecular percentage of the oxides of bivalent elements totalling 7 and less than 12 and also containing over 1% of aluminia.

2. A glass having a combined silica and alkali percentage composition over 90 and having the molecular ratio of alkali to silica between 26 and 29 to 100 and the molecular ratio of bivalent oxides to silica of between 7 and 10 to 100, and also containing over 1% of aluminia.

3. A glass having a combined silicia and alkali percentage composition over 90 and having the molecular ratio of alkali to silica between 26 and 29 to 100 and the molecular ratio of bivalent oxides to silica of between 7 and 10 to 100.

In testimony whereof we have signed our names.

EUGENE C. SULLIVAN.
WILLIAM CHITTENDEN TAYLOR.

|  | A | | B | | C | |
|---|---|---|---|---|---|---|
|  | Percentage composition. | Molecular composition. | Percentage composition. | Molecular composition. | Percentage composition. | Molecular composition. |
| $SiO_2$ | 72.1 | 100. | 71.9 | 100. | 74.5 | 100. |
| $Na_2O$ | 21.1 | 28.5 | 21.2 | 28.7 | 20.2 | 26.3 |
| $Al_2O_3$ | 2.0 | 1.64 | 2.0 | 1.64 | | |
| CaO | 2.77 | 4.14 | 2.45 | 3.68 | 2.7 | 3.89 |
| MgO | 1.95 | 4.05 | 2.45 | 5.10 | 2.6 | 5.22 |

Certificate of Correction.

It is hereby certified that in Letters Patent No. 1,408,145, granted February 28, 1922, upon the application of Eugene C. Sullivan and William Chittenden Taylor, of Corning, New York, for an improvement in "Glass," an error appears in the printed specification requiring correction as follows: Line 57, for the expression "May 6, 1919," read *March 1, 1921;* and that the said Letters Patent should be read with this correction therein that the same may conform to the record of Patent No. 1,369,988 in the Patent Office.

Signed and sealed this 20th day of June, A. D., 1922.

[SEAL.] KARL FENNING,

*Acting Commissioner of Patents.*